United States Patent [19]

Yokoyama et al.

[11] Patent Number: 4,664,235
[45] Date of Patent: May 12, 1987

[54] LOCK-UP CLUTCH CONTROLLER FOR THE FLUID COUPLING OF AN AUTOMOTIVE AUTOMATIC TRANSMISSION

[75] Inventors: Shoji Yokoyama; Nobuaki Miki, both of Anjo, Japan

[73] Assignees: Aisin-Warner, Ltd., Aichi; Toyota Motor Corporation, Toyota, both of Japan

[21] Appl. No.: 895,598

[22] Filed: Aug. 15, 1986

Related U.S. Application Data

[63] Continuation of Ser. No. 685,124, Dec. 20, 1984, abandoned.

[30] Foreign Application Priority Data

Dec. 30, 1983 [JP] Japan ............................ 58-245814

[51] Int. Cl.⁴ .............................................. F16D 47/06
[52] U.S. Cl. ................................ 192/3.29; 192/3.31; 192/3.58; 192/0.033
[58] Field of Search .............. 192/0.032, 0.033, 0.075, 192/0.076, 3.28, 3.29, 3.3, 3.31, 3.58, 52; 74/645, 732, 733

[56] References Cited

U.S. PATENT DOCUMENTS

| | | | |
|---|---|---|---|
| 4,023,444 | 5/1977 | Murakami | 192/0.032 X |
| 4,090,417 | 5/1978 | Burcz et al. | 192/3.3 X |
| 4,406,355 | 9/1983 | Bionaz | 192/3.58 |
| 4,419,910 | 12/1983 | Miki et al. | 74/867 |
| 4,428,467 | 1/1984 | Hiramatsu | 192/0.076 X |
| 4,466,312 | 8/1984 | Oguma | 74/868 |
| 4,468,988 | 9/1984 | Hiramatsu | 74/732 X |

FOREIGN PATENT DOCUMENTS

| | | | |
|---|---|---|---|
| 43545 | 1/1982 | European Pat. Off. | 192/3.29 |
| 31255 | 9/1977 | Japan | 192/3.29 |
| 58-94667 | 6/1983 | Japan . | |
| 2081413 | 2/1982 | United Kingdom | 192/3.31 |

Primary Examiner—Rodney H. Bonck
Assistant Examiner—David A. Testardi
Attorney, Agent, or Firm—Pahl, Lorusso & Loud

[57] ABSTRACT

A lock-up clutch controller for the fluid coupling of an automotive automatic transmission, capable of making a lock-up clutch provided in the fluid coupling for directly coupling the input shaft and the output shaft of the fluid coupling engage or disengage smoothly responsive to an electric duty signal applied to a lock-up operation control solenoid valve. The lock-up clutch controller includes, as essential components, a lock-up clutch relay valve (a spool valve), a lock-up clutch control valve (a spool valve) and the lock-up operation control solenoid valve which operates in accordance with an electrical duty ratio signal to control the lock-up relay valve and the lock-up operation control valve so that the working fluid is supplied to the fluid coupling or the fluid coupling is drained appropriately for the smooth engagement and disengagement of the lock-up clutch. The torque of the lock-up clutch can be controlled so as to be increased or decreased gradually or maintained at a magnitude allowing slippage by applying a gradually variable electrical duty ratio signal to the lock-up operation control solenoid valve.

15 Claims, 7 Drawing Figures

LOCK-UP CLUTCH CONTROLLER FOR THE FLUID COUPLING OF AN AUTOMOTIVE AUTOMATIC TRANSMISSION

This is a continuation of application Ser. No. 685,124, filed Dec. 20, 1984, now abandoned.

BACKGROUND OF THE INVENTION (i) Field of the Invention

The present invention relates to a lock-up clutch controller for controlling the lock-up clutch of a fluid coupling of an automotive automatic transmission.

(ii) Description of the Prior Art

It is desirable to engage a lock-up clutch for locking a fluid coupling gradually with a limited slip in coupling directly the input and output shafts of the fluid coupling, otherwise undesirable shock will be produced. In view of such requirement for the performance of the lock-up clutch, the inventors of the present application proposed a direct-coupling clutch control mechanism for an automotive automatic transmission in Japanese Patent Application No. 180870/1983. The direct-coupling clutch control mechanism proposed in this prior application was intended to control a direct-coupling clutch provided in a fluid coupling, which clutch includes a frictional coupling surface connected to the input shaft and a clutch disk connected to the output shaft and adapted to engage when working fluid is supplied (1) from a second fluid line connected to the interior of the fluid coupling at a point other than the gap between the frictional coupling surface and the clutch disk and (2) to a first fluid line connected to the gap and to disengage when the working fluid is supplied from the first fluid line to the second fluid line. The control mechanism was provided with a direct-coupling clutch control valve for either (1). Connecting the second fluid line to a fluid source and connecting the first fluid line to a first draining line in order to make the direct-coupling clutch engage or (2) connecting the first fluid line to the fluid source and connecting the second fluid line to a second draining line in order to make the direct-coupling clutch disengage, according to the running condition of the vehicle. That direct-coupling clutch provided for gradual engagement by limiting the flow rate of the working fluid with a flow rate control mechanism provided in the first draining line. However, since this direct-coupling clutch control mechanism employed orifices for regulating the fluid pressure in disengaging the lock-up clutch, the pressure regulating characteristics were unvariable, and hence the lock-up clutch could not engage smoothly and sometimes shock was produced. When the pressure was regulated to enable smooth engagement of the direct-coupling clutch, the pressure within the fluid coupling dropped and cavitation was likely to occur. Furthermore, when a first spool valve for changing the connection of the clutch disengaging circuit and the clutch engaging circuit to the pressure source or to the drain line and a second spoolvalve for regulating the speed of variation of the fluid pressure difference between the clutch disengaging circuit and the clutch engaging circuit were provided, the first and second spool valves required separate control means, thus complicating the control circuit and procedures.

SUMMARY OF THE INVENTION

Accordingly, it is an object of the present invention to provide a lock-up clutch controller for the fluid coupling of an automotive automatic transmission, capable of controlling the operation of the lock-up clutch electrically to minimize shock.

Another object of the present invention is to provide a lock-up clutch controller for the fluid coupling of an automotive automatic transmission, capable of reliably preventing excessive pressure rise within the fluid coupling so that cavitation generating frequency is reduced, and thereby the durability of the automatic transmission is improved.

A further object of the present invention is to provide a direct-coupling clutch controller for the fluid coupling of an automotive automatic transmission, having simple construction and simple control procedure.

The lock-up clutch controller for a fluid coupling of an automotive automatic transmission according to the present invention is intended to control a lock-up clutch provided within the casing of the fluid coupling, the lock-up clutch, having a frictional coupling surface connected to the input shaft, a clutch disk connected to the output shaft, a gap between the frictional coupling surface and the clutch disk connected to a first fluid line and a space in the case of the fluid coupling other than the gap connected to a second fluid line. The novel controller of the present invention is adapted to engage when the working fluid is supplied from the second fluid line to the first fluid line and to disengage when the working fluid is supplied from the first fluid line to the second fluid line. The novel controller includes a solenoid valve which regulates line pressure supplied thereto from a fluid pressure source through a line pressure supply line and through a flow rate controlling restrictor according to the duty ratio of an electric signal to generate a solenoid pressure. The novel controller further includes a lock-up clutch relay valve which changes the connection of the fluid coupling having the lock-up clutch and the associated fluid supply lines on the basis of the solenoid pressure, and a lock-up clutch control valve which regulates the pressure of the fluid discharged from the first fluid line to produce a pressure corresponding to the solenoid pressure.

The lock-up clutch controller for the fluid coupling of an automotive automatic transmission according to the present invention has the following advantages.

(1) The electrical control of the operation of the lock-up clutch on the basis of duty ratio enables fine control of shock and the control of the pressure of the drain on the basis of duty ratio further optimizes the control of the operation of the lock-up clutch.

(2) Holding the duty ratio to be applied to the solenoid valve at a fixed value within a range in which the control valve is shifted enables maintenance of an appropriate torque capacity for the lock-up clutch.

(3) Regulating the flow rate of the fluid drained from the lock-up clutch in making the lock-up clutch engage or disengage prevents the excessive pressure drop within the fluid coupling.

(4) Controlling the lock-up clutch relay valve and the lock-up clutch control valve by a single solenoid valve simplifies the construction of the fluid circuit and facilitates the control procedure.

(5) Controlling both the lock-up clutch relay valve and the lock-up clutch control valve by a solenoid pressure generated by a solenoid valve controlled on the basis of duty ratio enables precise control of the lock-up clutch responsive to the running condition of the vehicle and the smooth engagement and disengagement of the lock-up clutch.

DETAILED DESCRIPTION OF THE INVENTION

Figure 1:
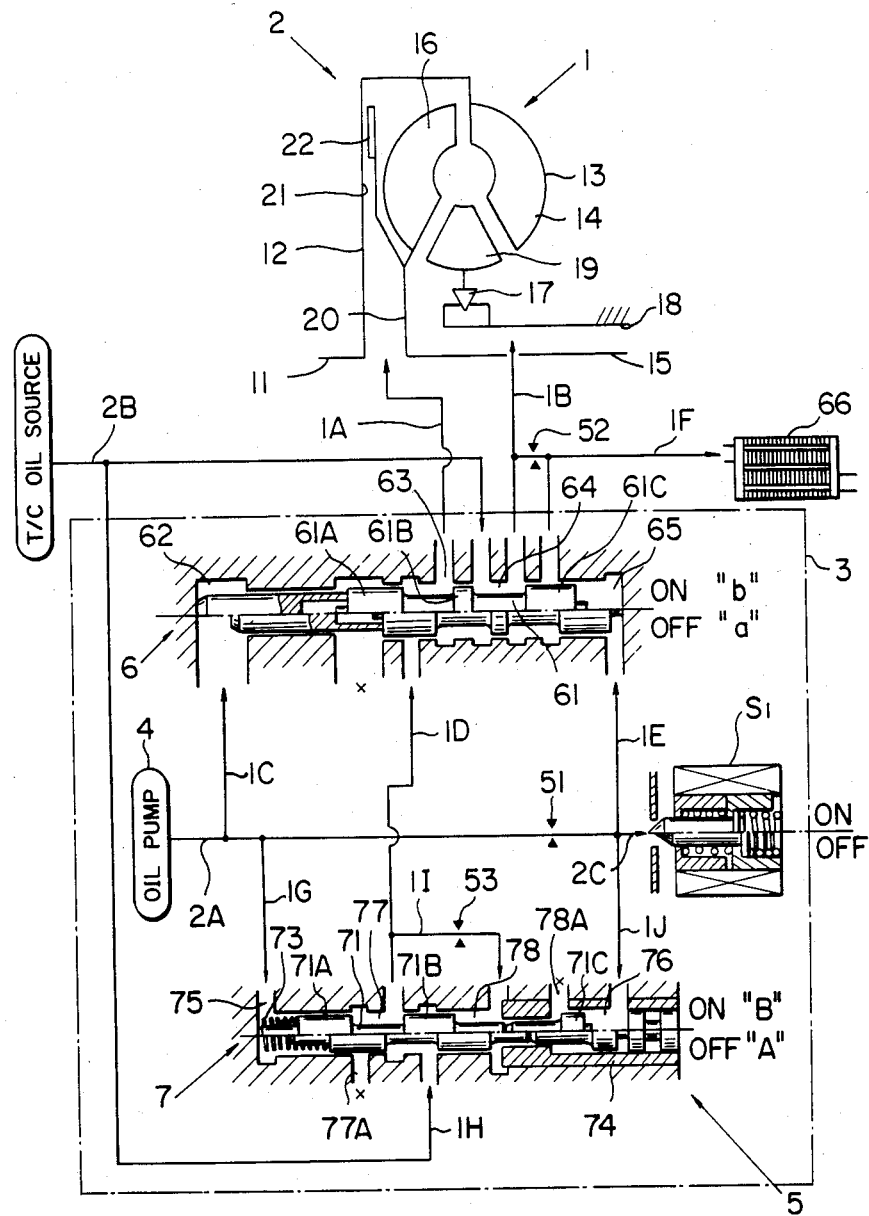
FIG. 1 is a schematic hydraulic circuit diagram of the hydraulic controller of a lock-up clutch controller for the fluid coupling of an automotive automatic transmission, according to the present invention.

The invention will be described with reference to a lock-up clutch controller for the fluid coupling of an automotive automatic transmission, embodying the present invention, in connection with the accompanying drawings.

Indicated at 1 is a torque converter employed as the fluid coupling of the automotive automatic transmission. The torque converter 1 comprises a pump impeller 14 having a pump shell 13 welded to one end of a front cover 12 fixed to an input shaft 11 and blades disposed within the pump shell 13, a turbine runner 16 connected through a clutch hub 20 to an output shaft 15 and disposed between the front cover 12 and the pump impeller 14, and a stator 19 connected through a one-way clutch 17 to a fixed part 18 of the automatic transmission. Indicated at 2 is a lock-up clutch provided within the torque converter. The lock-up clutch 2 consists of a frictional surface 21 formed over the inside surface of the front cover 12 and a clutch disk 22 having a hub 20 connected to the output shaft 15 and disposed between the front cover 12 and the turbine runner 16. The gap formed between the front cover 12 and the clutch disk 22 communicates with a first fluid line 1A and the space within the torque converter 1 other than the gap communicates with a second fluid line 1B.

Indicated generally at 3 is a hydraulic controller comprising an oil pump 4 functioning as a fluid pressure source and a regulator valve, not shown, which regulates the fluid pressure supplied by the oil pump 4 responsive to operational conditions of the vehicle such as running speed and the degree of opening of the throttle valve to generate a line pressure. A manual valve, not shown, is operated manually by the driver to select a shift range, i.e., one of the running conditions, and which selectively connects a fluid line 2A, for supplying the working fluid to the corresponding hydraulic servomechanism, to a line pressure supply line. A shift valve, not shown, is provided in the line pressure supply fluid line 2A for supplying the line pressure to each hydraulic servomechanism, and is adapted to be controlled by a shifting operation control solenoid responsive to the running conditions of the vehicle, such as the running speed and the degree of opening of the throttle valve, to control the supply of fluid at line pressure to each hydraulic servomechanism and the draining of the hydraulic servomechanism.

Indicated generally at 5 is a lock-up clutch controller comprising a lock-up operation control solenoid valve S1 which regulates the line pressure supplied through the line pressure supply line 2A through an orifice 51 responsive to an electric duty signal (working time/period) and a lock-up clutch relay valve 6 which receives a solenoid pressure Ps generated by the solenoid valve S1 and connects the torque converter 1 having the lock-up clutch 2 to either the first fluid line 1A or to the second fluid line 1B. A lock-up clutch control valve 7 also receives a solenoid pressure and generates a fluid pressure corresponding to the solenoid pressure received.

The lock-up clutch relay valve 6 has a spool 61 having three lands 61A, 61B and 61C and a right end chamber 65 and a left end chamber 62.

The left end chamber 62 is connected to a fluid line 1C communicating with the line pressure supply line 2A. A chamber 63 is connected to a fluid line 1D which, in turn, is connected through the lock-up clutch control valve 7 to a fluid line 2B which, in turn, is connected to the oil pump (the fluid pressure source for the torque converter) to introduce a torque converter pressure. The right end chamber 65 is connected to a fluid line 1E which is connected through an orifice 51 to a line pressure supply line 2A. When the spool 61 of the lock-up clutch relay valve 6 is shifted to the disengaging position (right side as viewed in FIG. 1), the chamber 63 communicates with the fluid line 2B and the first fluid line 1A, while chamber 64 communicates with the second fluid line 1B and a fluid line 1F extending to a cooler 66.

When the spool 61 is shifted to the engaging side (left side as viewed in FIG. 1), the chamber 63 communicates with the first fluid line 1A and the fluid line 1D, while the chamber 64 communicates with the fluid line 2B in which the torque converter pressure prevails and the second fluid line 1B. The fluid line 1B is connected through an orifice 52 also to the cooler 66.

The lock-up clutch control valve 7 has a spool 71 having three lands 71A, 71B and 71C. A spring 73 is provided at the left end of the valve to urge the spool 71 rightward. A sleeve 74 is disposed at the right end of the valve body. In conjunction with the valve body the spool 71 forms a left end chamber 75, a right end chamber 76, a chamber 77 between the lands 71A and 71B and a chamber 78 between the lands 71B and 71C. Ports 77A and 78A are formed in the chambers 77 and 78 respectively.

The left end chamber 75 is connected to a fluid line 1G communicating with the line pressure supply fluid line 2A. The chamber 77 is connected to a fluid line 1H, communicating with the torque converter pressure fluid line 2B, and to the fluid line 1D. The chamber 78 is connected to a fluid line 1I communicating through an orifice 53 with the fluid line 1D. The right end chamber 76 is connected to a fluid line 1J communicating through the orifice 51 with the line pressure supply fluid line 2A.

When the spool 71 of the lock-up clutch control valve 7 is shifted to the disengaging side (right side as viewed in FIG. 1 position "A"), the chamber 77 communicates with the fluid lines 1H and 1D. When the spool 71 is shifted to the engaging side (left side as viewed in FIG. 1 position "B"), the chamber 77 communicates with the fluid line 1D and the port 77A.

The lock-up operation control solenoid valve S1 is connected to a fluid line 2C communicating through an orifice 51 with the line pressure supply fluid line 2A. When energized, the lock-up operation control solenoid valve S1 produces a high-level solenoid pressure PS1 in the right end chambers 65 and 76 to shift the spools 61 and 71 leftward. When the lock-up operation control solenoid valve S1 is not energized, the fluid pressure in the right end chambers 65 and 76 is reduced to a low-level solenoid pressure PS2.

The functions of the valves 6 and 7 for engaging the lock-up clutch 2 will be described hereinafter.

Figure 7:
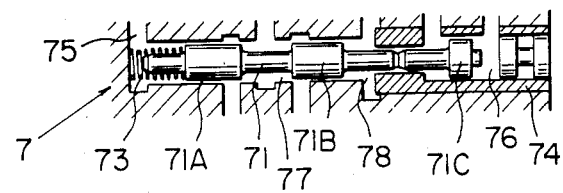
FIG. 7 is a fragmentary sectional view of the lock-up clutch control valve.
Figure 2:
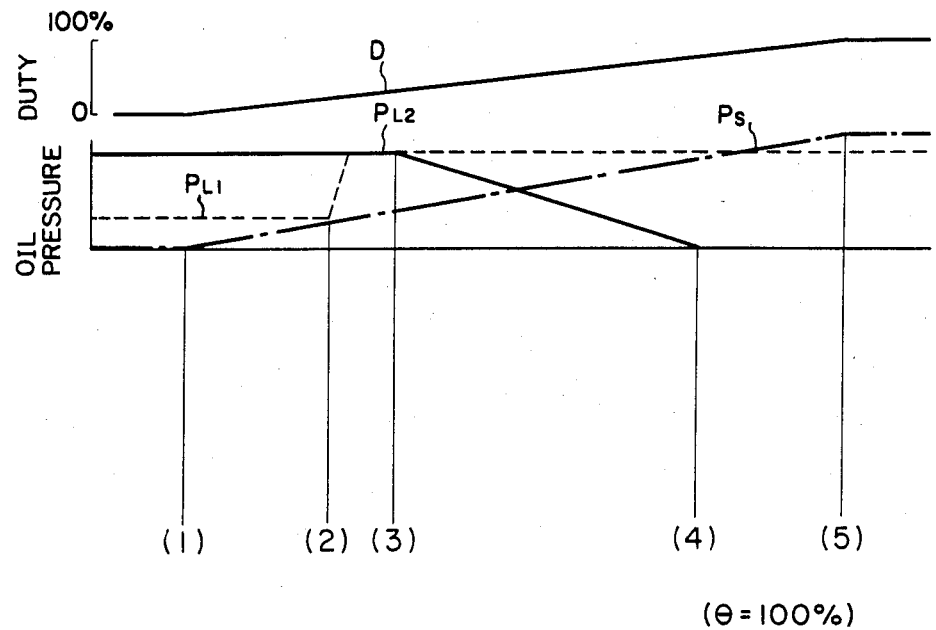
FIG. 2 is a diagram depicting operation of the lock-up clutch.
Figure 5:
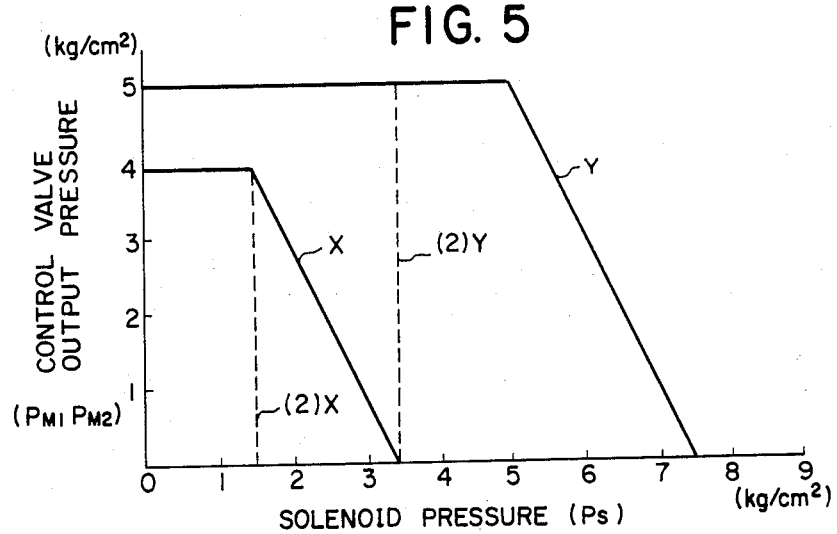
FIG. 5 is a graph showing the dependence of the output pressure of the control valve on the solenoid pressure.

In engaging the lock-up clutch 2, the duty ratio D of the electric signal, to be applied to the lock-up operation control solenoid valve, S1 is changed gradually from 0% up to 100% to increase the solenoid pressure $P_s$ gradually, as shown in FIG. 2. While the solenoid pressure $P_s$ is in a low range (a range between [1] and [2] in FIG. 2), the relay valve 6 and the control valve 7 are in a state "a" and a state "A" shown in FIG. 1 respectively. In this state, the lock-up clutch 2 is not engaged. Upon the rise of the solenoid pressure $P_s$ to a level corresponding to [2], the spool 61 of the relay valve 6 is shifted to change the condition of the relay valve 6 to a state "b", while the control valve 7 is still in the state "A". Accordingly, in this state, the torque converter pressure is supplied as a lock-up clutch engaging pressure PL1 through the fluid lines 2B and 1B and the torque converter pressure is supplied as a lock-up clutch disengaging pressure PL2 through the fluid lines 1H, 1D and 1A, and hence the lock-up clutch remains in the disengaged state without producing any torque. When the solenoid pressure $P_s$ is in a range between [3] and [4], the condition of the control valve 7 is changed to a pressure regulating state (FIG. 7), and thereby a fluid pressure corresponding to the solenoid pressure is produced in the fluid line 1D as shown in FIG. 5. In this state, the torque converter pressure (the same as at [2]) is supplied as the lock-up clutch engaging pressure PL1 through the fluid lines 2B and 1B, whereas a fluid pressure according to the solenoid pressure $P_s$ is supplied as the lock-up clutch disengaging pressure PL2 through the fluid lines 1D and 1A. Accordingly, the lock-up clutch 2 produces a torque corresponding to the pressure difference between the lock-up clutch engaging pressure PL1 and the lock-up clutch disengaging pressure PL2. When the solenoid pressure $P_s$ increases further and after the solenoid pressure has exceeded a pressure corresponding to [4], the condition of the lock-up control valve 7 is changed to the state B shown in FIG. 1, where the port 77A communicates with the fluid line 1D to drain the fluid line 1D. In this state, the torque converter pressure is supplied as the lock-up clutch engaging pressure PL1 and no pressure is applied as the lock-up clutch disengaging pressure PL2. Consequently, the torque of the lock-up clutch is increased to the maximum level.

Thus the lock-up clutch is made to engage gradually. The lock-up clutch can be made to disengage likewise.

It is also possible to control the lock-up clutch for slipping engagement of an appropriate torque by holding the duty ratio to be applied to the lock-up operation control solenoid valve S1 at a fixed value within a range for establishing the pressure regulating state of the control valve 7.

Figure 3:
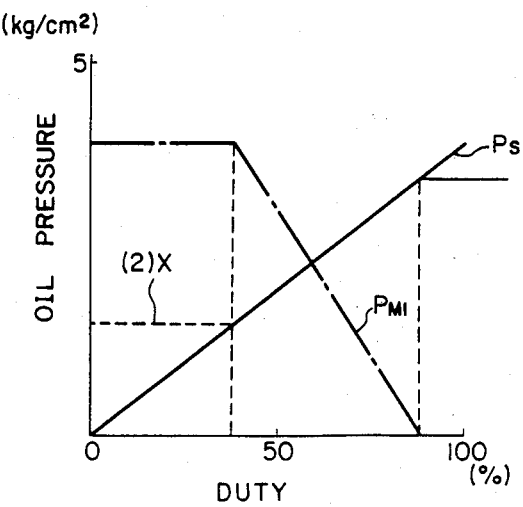
FIGS. 3 and 4 are graphs showing the characteristic curves for solenoid pressure and the output pressure of the control valve as functions of duty.

FIG. 3 shows the variation of the solenoid pressure $P_s$ and the output pressure PM1 of the control valve, in line 1D, with duty ratio for $\theta = 0\%$ (theta represents the degree of throttle opening). (2)X Indicates the switching point of the relay valve 6.

Figure 4:
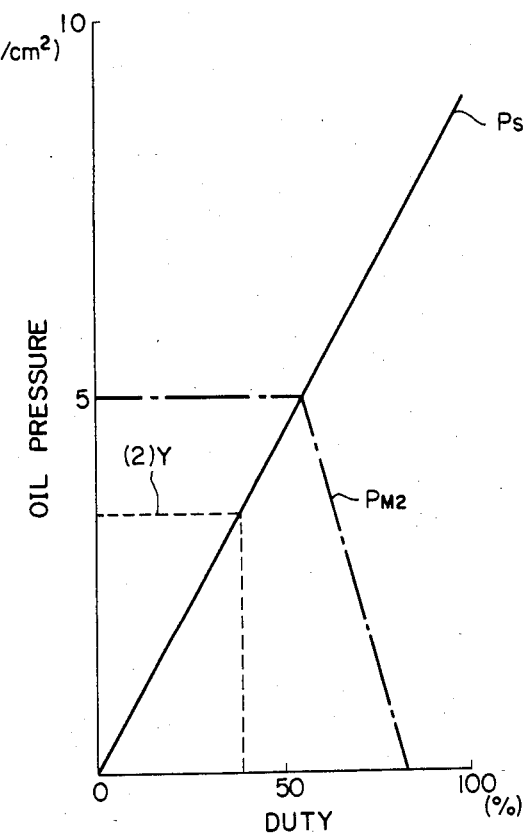

FIG. 4 shows the variation of the solenoid pressure $P_s$ and the output pressure PM2 of the control valve, in line 1D, with duty ratio for $\theta = 100\%$. (2)Y Indicates the switching point of the relay valve 6.

FIG. 5 shows the variation of output pressures PM1 and PM2 of the control valve with solenoid pressure $P_s$ for $\theta = 0\%$ (X) and $\theta = 100\%$ (Y). (2)X and (2)Y indicate the solenoid pressures $P_s$ when the relay valve 6 is switched.

Figure 6:
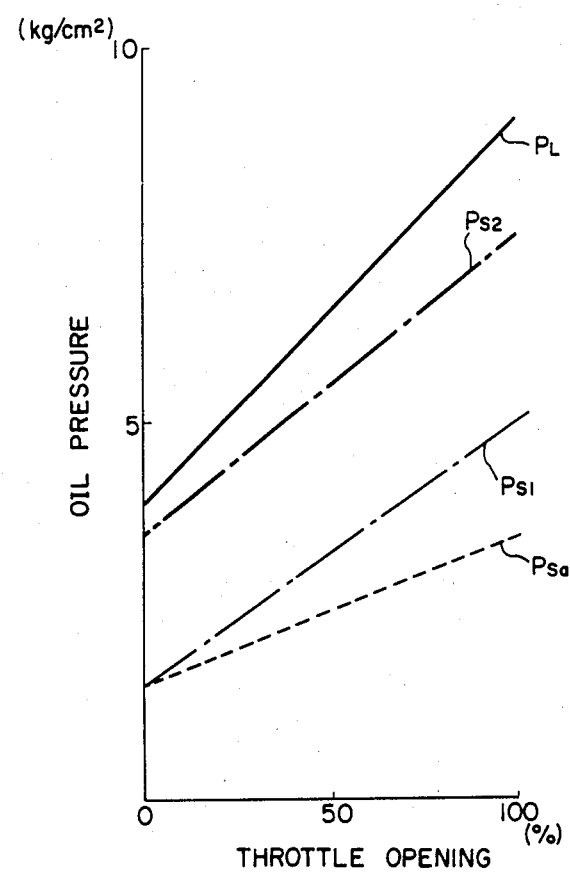
FIG. 6 is a graph showing the relationship of the pressure regulating range of the control valve to the degree of opening of the throttle valve.

FIG. 6 shows the relationship between the pressure regulating range (range for the slipping engagement of the lock-up clutch ) $P_s1$ to $P_s2$ of the control valve 7 and the degree of opening of the throttle valve, in which PL is the line pressure and $P_{sa}$ is the solenoid pressure at which the relay valve is switched.

What is claimed is:

1. A lock-up clutch controller for the fluid coupling of an automotive automatic transmission, for controlling a lock-up clutch provided within the case of the fluid coupling, said fluid coupling having input and output shafts, and said lock-up clutch having a friction surface connected to the input shaft and a clutch disk connected to the output shaft, said friction surface and said clutch disk defining a gap therebetween and being adapted to engage when a pressure supplied from the second fluid line, connected to the interior space of the fluid coupling outside said gap, exceeds a pressure within a first fluid line connected to the gap, and to disengage when the pressure supplied from the first fluid line exceeds the pressure within the second fluid line, said controller comprising:

a pressure source for supplying working fluid at line pressure to said fluid coupling;

a solenoid valve which regulates the line pressure supplied thereto through a flow rate restrictor responsive to an electrical duty ratio signal to provide a solenoid pressure;

a lock-up clutch relay valve which receives the solenoid pressure and selectively connects said pressure source to the fluid coupling through either said first fluid line or said second fluid line, responsive to the solenoid pressure; and a lock-up clutch control valve which receives the solenoid pressure and produces a fluid pressure according to the solenoid pressure in the first fluid line.

2. A control system for a lock-up clutch for a fluid coupling of an automotive automatic transmission, which clutch is provided in a casing for said fluid coupling and wherein said clutch is adapted to engage or disengage according to the pressure difference between a first working fluid pressure applied through a first line to one surface of a clutch disk and a second, opposing, working fluid pressure applied through a second line to another surface of said clutch disk, the control system comprising:

a source for fluid coupling pressure;

a first spool valve including means for selectively connecting said fluid coupling pressure source to either said first line or said second line, for connecting said first line to a third line when said fluid coupling pressure source is in communication with said second line and for connecting said second line to a first drain line when said first line is in communication with said fluid coupling pressure source;

a second spool valve including means for selectively connecting said third line to either said fluid coupling pressure source or to a second drain line; and hydraulic control means for controlling the positioning of said first spool valve and said second spool valve.

3. A control system for a lock-up clutch for a fluid coupling of an automotive automatic transmission, which clutch is provided in a casing for said fluid coupling and wherein said clutch is adapted to engage or disengage according to the pressure difference between a first working fluid pressure applied through a first line to one surface of a clutch disk and a second, opposing, working fluid pressure applied through a second line to another surface of said clutch disk, the control system comprising:

a source for fluid coupling pressure;

a first spool valve including means for selectively connecting said fluid coupling pressure source to either said first line or said second line;

a second spool valve for regulating said pressure difference by control of the hydraulic pressure within a third line which is selectively placed in fluid communication with said first line through said first spool valve; and an electromagnetic solenoid valve which generates a solenoid hydraulic pressure for control of said first spool valve over a first range of duty ratio and said second spool valve over a second range of duty ratio.

4. The control system of claim 2 further comprising:
a cooler for said working fluid, said cooler being in fluid communication with said first spool valve through said first drain line.

5. The control system of claim 2 wherein:
said second spool valve has a spool and a spring which urges said spool in one direction for connecting said third line with said fluid coupling pressure source, said spool being urged in the opposite direction by said hydraulic control means for connecting said third line with said second drain line.

6. The control system of claim 5 wherein:
said hydraulic control means comprises:
a solenoid valve for generating a solenoid pressure, said spool being urged in said opposite direction by said solenoid pressure and by the pressure in said third line.

7. The control system of claim 8 further comprising:
a pump for supplying a line pressure;
and wherein
said spool of said second spool valve is urged by said line pressure and said spring in said one direction.

8. The control system of claim 7 wherein:
said line pressure urges said first spool valve toward the position wherein said first line is in communication with said fluid coupling pressure source.

9. The control system of claim 8 additionally comprising a fluid passage for receiving said solenoid pressure and said line pressure, and orifice means mounted within said fluid passage for separating said solenoid pressure from said line pressure.

10. A control system in accordance with claim 5 further comprising:
a cooler for the working fluid; and
a first drain line providing fluid communication between said cooler and said first spool valve;
and wherein:
said first spool valve has a first spool, and when said first spool is in a first position, said first line is in fluid communication with said fluid coupling pressure source and said second line is connected to said first drain line, and when said first spool is in a second position, said first line is connected with said third line and said second line is connected with said fluid coupling pressure source.

11. The control system of claim 10 further comprising:
a pump for supplying a line pressure;
and wherein:
said first spool is urged toward said first position by said line pressure and toward said second position by said solenoid pressure.

12. The control system of claim 11 wherein said second spool valve comprises a second spool and a spring, said second spool being urged toward an off position by said spring, and toward an on position by said solenoid pressure.

13. The control system of claim 12 further comprising:
a second drain line connected to said second spool valve;
a hydraulic pressure supply passage connecting said fluid coupling pressure source to said second spool valve;
and wherein:
said second spool valve controls the hydraulic pressure in said third line by establishing fluid communication between said third line and said fluid coupling pressure source when said second spool of said second spool valve is in said off position, and by establishing fluid communication between said third line and said second drain when said spool of said second spool valve is in the on position.

14. The control system of claim 13 wherein said spool of said second spool valve is urged toward the on position by the hydraulic pressure in said third line and by said solenoid pressure and is urged toward said off position by said line pressure and by said spring.

15. The control system of claim 3 further comprising:
a first drain passage connected to said first spool valve;
a hydraulic pressure supply passage for connecting said fluid coupling pressure source to said first spool valve and to said second spool valve; and
a second drain passage connected to said second spool valve;
and wherein:
said second spool valve controls fluid communication between said third line and said pressure source or said second drain to regulate the hydraulic pressure within said third line.

* * * * *

UNITED STATES PATENT AND TRADEMARK OFFICE
CERTIFICATE OF CORRECTION

PATENT NO. : 4,664,235
DATED : May 12, 1987
INVENTOR(S) : Shoji Yokoyama; Nobuaki Miki It is certified that error appears in the above—identified patent and that said Letters Patent is hereby corrected as shown below:

Col. 1, line 39, "(1). Connecting" should be --(1) connecting--.

Col. 7, line 51 (claim 7, line 1) "8" should be --6--.

Col. 8, line 3 (claim 10, line 1) "5" should be --3--.

Signed and Sealed this

Twenty-second Day of September, 1987

Attest:

DONALD J. QUIGG

Attesting Officer     Commissioner of Patents and Trademarks